United States Patent
Grosse

(10) Patent No.: US 10,982,793 B2
(45) Date of Patent: Apr. 20, 2021

(54) VALVE CONTROL HEAD

(71) Applicant: Buerkert Werke GmbH & Co. KG, Ingelfingen (DE)

(72) Inventor: Kersten Grosse, Radebeul (DE)

(73) Assignee: BUERKERT WERKE GMBH & CO. KG, Ingelfingen (DE)

(*) Notice: Subject to any disclaimer, the term of this patent is extended or adjusted under 35 U.S.C. 154(b) by 0 days.

(21) Appl. No.: 16/128,710

(22) Filed: Sep. 12, 2018

(65) Prior Publication Data
US 2019/0137000 A1 May 9, 2019

(30) Foreign Application Priority Data

Sep. 12, 2017 (DE) .................... 10 2017 121 094.6

(51) Int. Cl.
*F16K 37/00* (2006.01)
*F16K 31/12* (2006.01)
*F16K 31/02* (2006.01)

(52) U.S. Cl.
CPC .......... *F16K 37/0041* (2013.01); *F16K 31/02* (2013.01); *F16K 31/12* (2013.01)

(58) Field of Classification Search
CPC .................................................. F16K 37/0041
USPC ........................................................ 137/554
See application file for complete search history.

(56) References Cited

U.S. PATENT DOCUMENTS

| 5,432,493 | A | * | 7/1995 | Pitt | ...................... | G01D 5/2216 |
|---|---|---|---|---|---|---|
| | | | | | | 336/136 |
| 5,469,880 | A | * | 11/1995 | Zimmerly | ................. | B67C 3/28 |
| | | | | | | 137/240 |
| 7,093,613 | B2 | * | 8/2006 | Hofling | ................. | H01F 7/1607 |
| | | | | | | 137/554 |
| 7,969,146 | B2 | * | 6/2011 | Christianson | ....... | F16K 37/0033 |
| | | | | | | 324/207.2 |
| 8,262,060 | B2 | * | 9/2012 | Heer | .................. | G05B 23/0256 |
| | | | | | | 137/554 |
| 8,413,679 | B2 | * | 4/2013 | Wenske | .............. | F15B 13/0814 |
| | | | | | | 137/560 |
| 8,622,077 | B2 | * | 1/2014 | Pogel | ...................... | F16K 31/06 |
| | | | | | | 137/315.03 |
| 2004/0211928 | A1 | | 10/2004 | Coura et al. | | |

FOREIGN PATENT DOCUMENTS

| DE | 10 2006 058 398 A1 | 6/2008 |
|---|---|---|
| DE | 20 2010 003 659 U1 | 8/2010 |
| EP | 1 491 862 A1 | 5/2004 |
| WO | 96/10731 A1 | 9/1995 |
| WO | 02/093058 A1 | 11/2002 |

* cited by examiner

*Primary Examiner* — Angelisa L. Hicks
(74) *Attorney, Agent, or Firm* — McNees Wallace & Nurick LLC

(57) ABSTRACT

A valve control head is provided, comprising a housing, control electronics, at least one control valve, fluid connections, electrical connections, a first measuring object, rigidly coupled to a first valve closure part, and a position measuring system, comprising measuring electronics and a first position sensor, wherein the first position sensor can detect a position of the first measuring object, and wherein the valve control head comprises a fastening device formed to couple a second position sensor.

11 Claims, 2 Drawing Sheets

VALVE CONTROL HEAD

The present invention relates to a valve control head for process valves.

BACKGROUND OF THE INVENTION

Valves are an essential controlling and regulating element in the processing and automation industry. For reasons of operational safety and for process control it is of particular importance to know the position of a valve and, related thereto, the position of a valve closure part in a valve. Process valves have at least one valve closure part, more complex process valves frequently have two valve closure parts in order to be able to control a plurality of fluid streams.

In order to be able to monitor the position of the valve closure parts, initiators are conventionally attached laterally to the process valve. These must be connected to the control head via a cable, which is unfavourable with respect to the installation space required.

It is thus the object of the present invention to provide an improved valve control head which permits particularly easy detection of a plurality of valve positions. At the same time, it should be possible to construct the valve control head in a modular fashion.

BRIEF SUMMARY OF THE INVENTION

This object is achieved in accordance with the invention by a valve control head comprising a housing, control electronics, at least one control valve, fluid connections, electrical connections, a first measuring object rigidly coupled to a first valve closure part, and a position measuring system comprising measuring electronics and a first position sensor, wherein the first position sensor can detect a position of the first measuring object and wherein the valve control head comprises a fastening device formed to couple a second position sensor.

With a valve control head designed in this manner the position of a valve closure part can be detected reliably. The option of attaching a second position sensor means that reliable position monitoring can also take place in process valves with two valve closure parts. These can also be referred to as two-way measuring systems. Initiators attached outside the control head can be omitted and so the control head is of inexpensive design optimised in terms of installation space.

The modular construction also makes it possible to use many identical parts in manufacturing the valve control head.

The valve closure parts are preferably each fixedly connected to a spindle, wherein in the case of process valves with two valve closure parts, a spindle is designed as a hollow spindle which is disposed concentric to the first spindle and is movable independently of the first spindle. The valve closure parts can also be designed as one piece with the spindles.

A measuring object is fastened to the spindles in each case, in particular to an end of the spindles protruding into the valve control head. Consequently, the valve closure parts are coupled to the measuring objects via the spindles and in particular in such a way that a movement of a valve closure part results in a corresponding movement of the measuring object.

According to a preferred embodiment, a second measuring object can be coupled to the valve control head together with the position sensor. For this purpose, the position sensor can comprise protrusions by which the measuring object is held on the position sensor. An additional spindle, in particular a hollow spindle, is coupled to the valve control head via the additional measuring object.

According to one embodiment, the fastening device can comprise a plug device. By means of the plug device, a second position sensor can be attached to the valve control head and electrically connected to the measuring electronics by simply being plugged onto the valve control head. For this purpose, the plug device can be designed as a bushing into which a plug disposed on the second position sensor can be inserted. Alternatively or additionally, the fastening device can comprise mechanical connection means, e.g. at least one latch element and/or a snap-fit connection.

According to a preferred embodiment, the position measuring system is fitted with an electrical switch, in particular with a multiplexer. In this way the advantage is achieved that large parts of the measuring electronics can be used by both position sensors when a second position sensor is attached to the control head. Therefore, the measuring electronics for the control head can be particularly inexpensive. In order to keep the measuring electronics as simple as possible both position sensors should be operated according to the same measuring principle.

In order that both position sensors can jointly use parts of the measuring electronics, the respective position sensor can be switched through to the measuring electronics by the electronic switch as selected. In this way the positions of two valve closure parts can be measured using only one measuring circuit.

Depending on the type of position sensor, an individual signal preprocessing device may be necessary. Since the signal preprocessing device is sensor-dependent, it will preferably be interposed between the position sensors and the switch.

The second position sensor can preferably be coupled-on outside the housing. This has the advantage that space for an excessively large housing does not have to be provided unnecessarily when the second position sensor is simply not mounted.

According to one embodiment, the control head can comprise an additional housing, wherein the second position sensor is disposed in the additional housing. The additional housing can be fixedly or releasably fastened to the housing of the valve control head. In particular, the additional housing can be attached only when the second position sensor is to be fastened to the valve control head. In order to fasten the additional housing mechanical fastening means, e.g. latching elements, can be provided. Alternatively, the additional housing can be screwed or glued.

The additional housing can also serve to fasten the valve control head to a hydraulic or pneumatic valve operating mechanism.

The position sensors can each comprise a measuring coil. A measuring coil can be used to reliably detect the position of a valve closure part, in particular the position of a measuring object fastened to the valve closure part. For example, the position sensors can be designed as Hall sensors.

The measuring object is preferably designed as an electrically and/or magnetically conductive ferromagnetic core and can be formed as a transmitter or target.

The position sensors can be substantially hollow-cylindrical in form. This form means that the position sensors can be integrated particularly well into the valve control head. In particular, the position sensors can be disposed concentrically to the spindles.

The position sensors preferably comprise a chamber to receive the measuring object. Thus, the measuring objects can be guided within the position sensors in such a way that a measuring voltage is induced by movement of the measuring objects. In a particularly preferred manner, the position sensors output a constantly changing output signal so that different valve positions can be detected.

BRIEF DESCRIPTION OF THE DRAWINGS

Further features and advantages of the invention will be apparent from the following description and the following drawings to which reference is made. In the drawings.

DETAILED DESCRIPTION OF THE INVENTION

Figure 1:
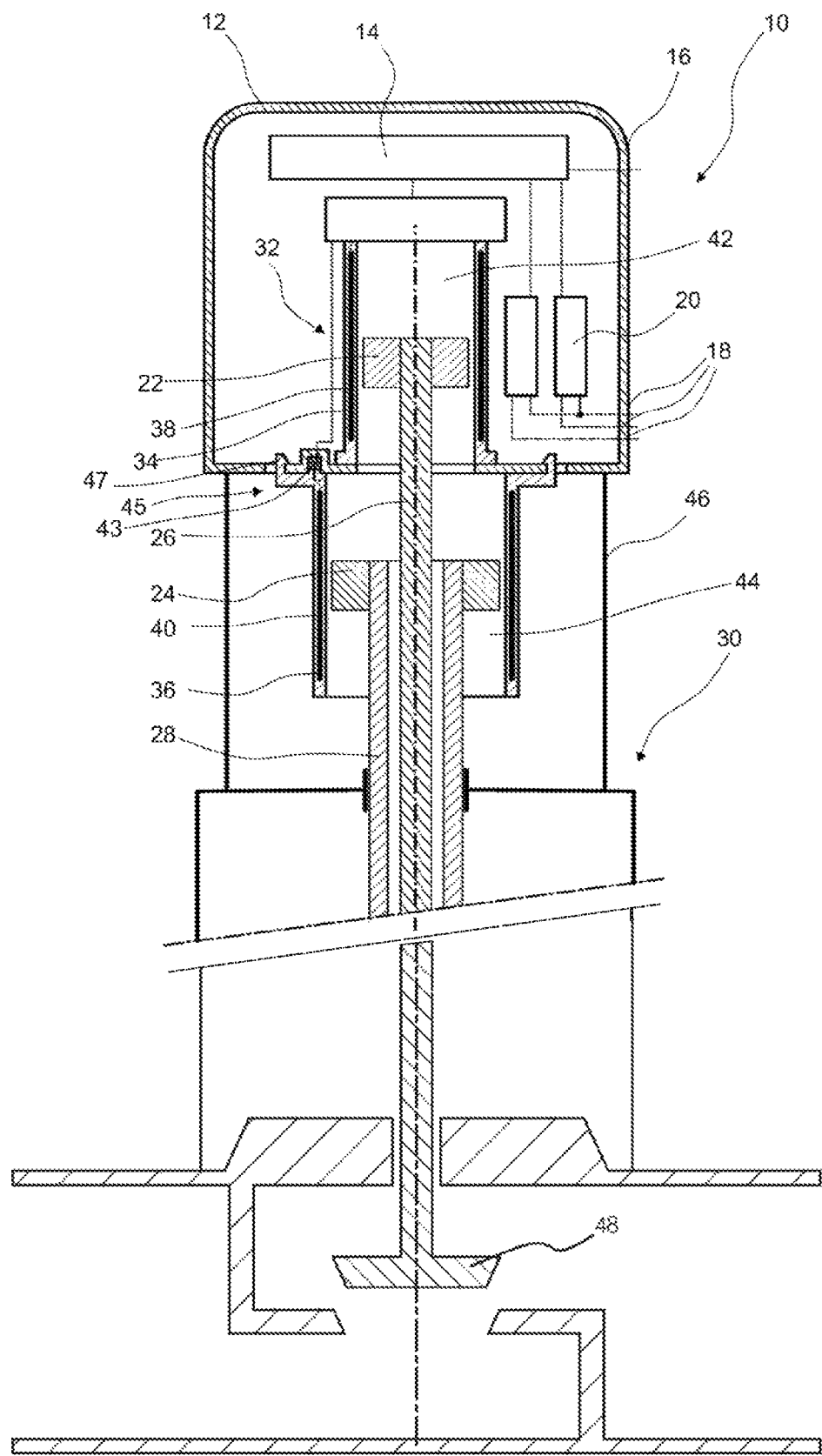
FIG. 1 schematically shows a valve control head in accordance with the invention for a process valve and FIG. 2 shows a circuit diagram of the measuring electronics of a valve control head in accordance with the invention.

FIG. 1 schematically shows a valve control head 10 which is designed to control a process valve. The valve control head 10 comprises a housing 12 and control electronics 14 disposed therein, electrical connections 16, fluid connections 18 and control valves 20.

The valve control head 10 further comprises two measuring objects 22, 24 which are fastened to two spindles 26, 28 of a process valve so that the measuring objects 22, 24 move jointly with the spindles 26, 28. Thus one spindle 28 is designed as a hollow spindle which is disposed concentrically to the first spindle 26 and can move independently thereof.

According to an alternative embodiment, the valve control head 10 can comprise only one measuring object 22 and one spindle 26.

A valve closure part 48 can be arranged at each of the ends of the spindles 26, 28. When the valve closure parts 48 lie against a valve seat of a process valve, a fluid flow through the process valve is blocked. If the valve closure parts 48 are spaced away from the valve seat, a fluid flow can take place.

Fluid lines can be connected to the fluid connections 18 in order to operate the valve pneumatically or hydraulically. Such valve operating mechanisms are sufficiently known from the prior art, thus no further details of the operating mechanism will be given at this point. A valve operating mechanism 30 is merely indicated schematically.

The position of the measuring objects 22, 24 can be detected via a position measuring system 32 of the valve control head 10. For this purpose, the position measuring system 32 comprises a first position sensor 34 and a second position sensor 36. The position sensors 34, 36 are substantially hollow-cylindrical in form and each comprise a measuring coil 38, 40. They are disposed one behind the other in a longitudinal direction of the valve control head 10, wherein a longitudinal direction of the valve control head 10 corresponds to a movement direction of the spindles 26, 28. Within the measuring coils 38, 40, the position sensors 34, 36 comprise a chamber 42, 44 to receive the measuring objects 22, 24.

The measuring objects 22, 24 comprise an electrically and/or magnetically conductive ferromagnetic core. Consequently, the position of the measuring objects 22, 24 and therefore also the position of the spindles 26, 28 and of the valve closure parts connected to the spindles 26, 28 can be detected in a known manner by electromagnetic induction by means of the position measuring system 32. The valve closure parts are not shown for the sake of simplicity.

The second position sensor 36 is preferably releasably connected to the valve control head 10, in particular plugged on the valve control head 10. For this purpose, the valve control head 10 comprises a fastening device 45. By means of the fastening device 45, the second position sensor 36 can be coupled to the valve control head 10 both mechanically and also electrically. The fastening device 45 comprises a plug device 43 with electrical contacts. The second position sensor 36 comprises appropriately corresponding plug elements which engage into the plug device 43 for the purposes of electrical contact. In addition, the fastening device 45 comprises mechanical connection elements 47, e.g. latching elements. Alternatively, for mechanical connection, a snap-fit connection can also be provided.

By means of the fastening device 45, the valve control head 10 can be constructed in modular fashion. The second position sensor 36 only has to be plugged-on when the process valve comprises two valve closure parts which can move independently of one another. In this way the valve control head 10 can be produced in a manner which is optimised in terms of cost and installation space.

The housing 12 can also be expanded in a modular fashion. The second position sensor 36 is disposed outside the housing 12 in an additional housing 46. The additional housing 46 is attached to the housing 12 if necessary, i.e. when the second position sensor 36 is also coupled to the valve control head 10.

In order to design measuring electronics 48 of the position measuring system 32 in the simplest manner possible, the position sensors 34, 36 can make joint usage of large parts of the measuring electronics 48.

Figure 2:
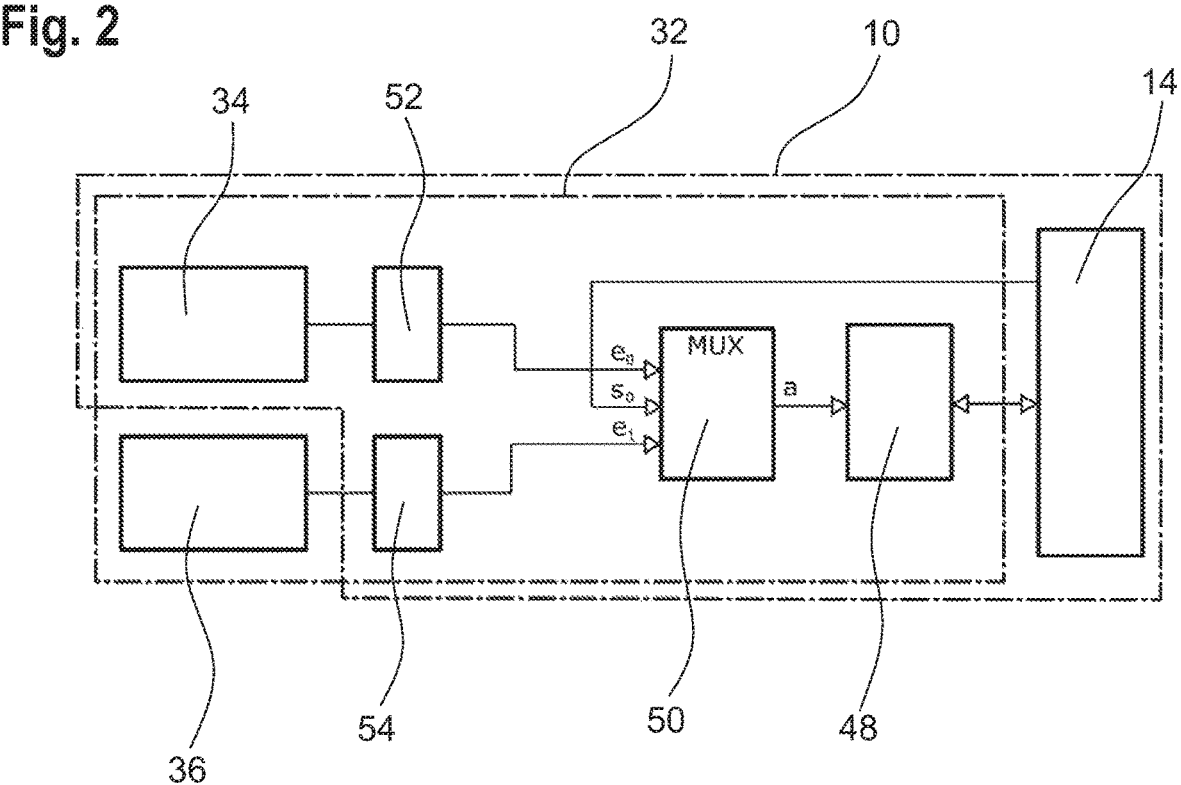

This is made clear with reference to a circuit diagram illustrated in FIG. 2.

In order to make possible a joint usage of parts of the measuring electronics 48, the position measuring system 32 has a switch 50. This switch can selectively switch the position sensors 34, 36 to the measuring electronics 48. Such switches 50 are also designated as multiplexers, abbreviated to MUX. Therefore, the positions of the measuring objects 22, 24 can be measured with only one measuring circuit.

Depending on the type of position sensor 34, 36, an individual signal preprocessing device 52, 54 may optionally be provided. Since the signal preprocessing device 52, 54 is sensor-dependent, it is interposed between the position sensors 34, 36 and the switch 50.

The invention claimed is:

1. Valve control head having a modular construction by means of a fastening device, comprising a housing, control electronics disposed in the housing, at least one control valve disposed in the housing, fluid connections and electrical connections secured to the housing, extending through the housing, or both secured to and extending through the housing, a first measuring object disposed in the housing and rigidly coupled to a first valve closure part, and a position measuring system at least partially disposed in the housing and, comprising measuring electronics and a first position sensor, wherein the first position sensor can detect a position of the first measuring object, wherein the valve control head comprises a fastening device formed to releasably couple a second position sensor to the valve control head, and wherein the fastening device is configured such that the second position sensor is capable of being coupled to the valve control head mechanically and electrically and wherein the fastening device is configured such that upon mechanical fastening the second position sensor is simultaneously electrically coupled to the valve control head.

2. Valve control head as claimed in claim 1, characterized in that the position measuring system is fitted with an electrical switch.

3. Valve control head as claimed in claim 2, characterized in that a sensor-dependent signal preprocessing device can be interposed between the position sensors and the switch.

4. Valve control head as claimed in claim 1, characterized in that the electronic switch can be used to selectively switch the respective position sensor through to the measuring electronics.

5. Valve control head as claimed in claim 1, characterized in that the second position sensor can be coupled outside the housing.

6. Valve control head as claimed in claim 1, characterized in that the control head comprises an additional housing, wherein the second position sensor is disposed in the additional housing.

7. Valve control head as claimed in claim 1, characterized in that the position sensors comprise a measuring coil.

8. Valve control head as claimed in claim 1, characterized in that the position sensors are substantially hollow-cylindrical in form.

9. Valve control head as claimed in claim 1, characterized in that the position sensors comprise a chamber to receive the measuring objects.

10. Valve control head having a modular construction by means of a fastening device, comprising a housing, control electronics disposed in the housing, at least one control valve disposed in the housing, fluid connections and electrical connections secured to the housing, extending through the housing, or both secured to and extending through the housing, a first measuring object disposed in the housing and rigidly coupled to a first valve closure part, a second measuring object disposed outside the housing in an additional housing attached to the housing and rigidly coupled to a second valve closure part, and a position measuring system at least partially disposed in the housing and, comprising measuring electronics, a first position sensor and a second position sensor, wherein the first position sensor can detect a position of the first measuring object and the second position sensor can detect a position of the second measuring object, wherein the valve control head comprises a fastening device formed to couple the second position sensor to the valve control head, and wherein the fastening device is configured such that the second position sensor is coupled to the valve control head mechanically and electrically and such that upon mechanical fastening the second position sensor is simultaneously electrically coupled to the valve control head, and wherein the second position sensor is releasably connected to the valve control head.

11. Valve control head having a modular construction by means of a fastening device, comprising a housing control electronics disposed in the housing, at least one control valve disposed in the housing, fluid connections and electrical connections secured to or extending through the housing, a first measuring object disposed in the housing and rigidly coupled to a first valve closure part, a second measuring object disposed outside the housing in an additional housing attached to the housing and rigidly coupled to a second valve closure part, and a position measuring system at least partially disposed in the housing and, comprising measuring electronics, a first position sensor and a second position sensor, wherein the first position sensor can detect a position of the first measuring object and the second position sensor can detect a position of the second measuring object, wherein the valve control head comprises a fastening device formed to couple the second position sensor to the valve control head, and wherein the fastening device is configured such that the second position sensor is coupled to the valve control head mechanically and electrically, and wherein the first and the second measuring objects are fastened to spindles that are disposed concentrically and are both surrounded by a measurement coil of the first and the second position sensor, respectively, wherein the measuring objects are arranged one behind the other in a longitudinal direction of the valve control head in such a way that no other element is placed between the measuring objects.

* * * * *